Nov. 14, 1933.   V. A. ELVIN   1,935,149
FISH KNIFE
Filed Sept. 22, 1930
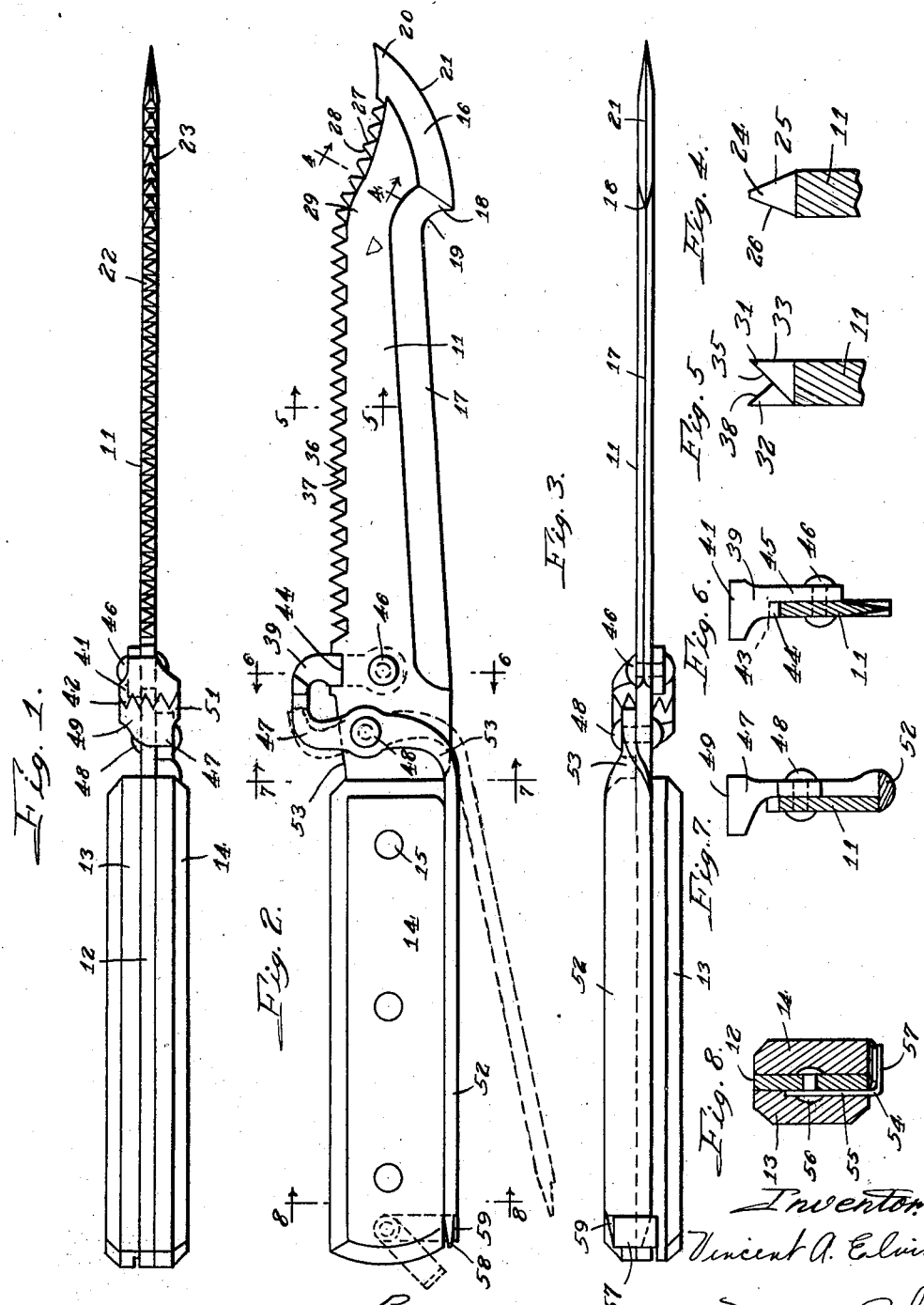
Inventor
Vincent A. Elvin Patented Nov. 14, 1933

1,935,149

UNITED STATES PATENT OFFICE 1,935,149

FISH KNIFE

Vincent A. Elvin, Rockford, Ill.

Application September 22, 1930
Serial No. 483,592

3 Claims. (Cl. 17—7)

This invention relates to cutlery and has special reference to a combination knife adapted to be employed in the cleaning of fish.

The average fisherman has experienced considerable difficulty in the cleaning of the general run of fish usually obtained upon a fishing expedition. This is primarily due to the characteristics of the different fish encountered, requiring instruments of different character to accomplish the cleaning operations. Doubtless the largest number of fish are those having an outer surfacing of scales which are most advantageously removed by scraping. This is often accomplished by employing a knife or the like but may be better accomplished in other ways. Some fish will be found to have an outer skin which it is necessary to remove by a pulling operation. All of the fish require certain cutting operations which are not well adapted to be performed by a knife of the customary shape characteristics.

I have, therefore, aimed to provide a combination knife having a cutting edge, a scaling edge, and means for grasping the skin of a fish to exert a pulling force thereon.

Another object of the invention is the provision of a combination knife having a cutting edge of improved shape characteristics particularly adapting the knife for use in cleaning fish.

A further object of the invention is the provision of a combination knife having a scaling edge of improved characteristics whereby the usual scaling operations may be accomplished with a minimum of effort.

A still further object of the invention is the provision of a combination knife having a pair of clamping jaws adapted to be clamped to the skin of a fish in skinning the same.

Another object of the invention is the provision of a combination knife having a pair of clamping jaws so positioned thereon as not to materially interfere with other functions of the tool and means for operating the jaws adapted to be secured in a convenient inoperative position when the jaws are not in use.

Other objects and attendant advantages of my improved construction will become apparent to those skilled in the art from the following description and the accompanying drawing, in which—

Figure 1 is a vertical elevation of the scaling edge of the tool;

Fig. 2 is a side elevation of the tool showing the open position of the jaws in dotted lines;

Fig. 3 is a vertical elevation of the cutting edge of the tool;

Fig. 4 is a section on the line 4—4 of Fig. 2 showing one type of scaling tooth;

Fig. 5 is a section on the line 5—5 of Fig. 2 showing the scaling teeth;

Fig. 6 is a section on the line 6—6 of Fig. 2 showing the manner in which one of the clamping jaws is secured to the blade;

Fig. 7 is a section on the line 7—7 of Fig. 2 showing the manner in which the rotatable clamping jaw is secured to the blade, and Fig. 8 is a section on the line 8—8 of Fig. 2 showing latch mechanism for securing the clamping jaw lever in its inoperative position.

The invention contemplates the provision of a knife having a blade and a handle, the blade being provided with a cutting edge along one edge thereof and a scaling edge along the opposite edge thereof. A pair of clamping jaws are secured to the blade near the handle and are caused to project along the edge of the blade between the scaling edge and the handle. One of the jaws is fixedly supported and the other is pivotally supported, a lever being secured to the pivotally supported jaw in order to move it into and out of registration with the complemental jaw. The lever lies along the edge of the handle and is adapted to be moved toward and away from the handle in operating the jaw. When the jaws are not in use the lever is caused to lie smoothly along the edge of the handle so as not to interfere with the use of the knife in its other functions.

Referring to the drawing—a blade 11 having a shank 12 is provided with a handle formed of a pair of scales 13 and 14 positioned on opposite sides of the shank 12. The scales may be of any suitable or desired material such as wood, bone, or the like, and are secured to the shank by means of rivets 15 or in any other suitable manner. One edge of the blade 11 is provided with a cutting edge having a slicing section, indicated generally by the numeral 16, a chopping section, indicated by the numeral 17, and an angularly disposed section indicated by the numeral 18. The chopping section 17 is inclined inward toward the center of the blade from the rear end thereof to the forward end thereof, ending in the angularly disposed portion 18. To form the portion 18 the cutting edge extends outward, as shown at 19, through substantially a right angle providing the curved cutting edge 19. The slicing section 16 extends from the end of the angularly disposed section 18 to the point 20 of the knife, the edge 21 thereof being arcuate as shown in Fig. 2. These three sections provide a cutting edge having a distinct advantage in three different types of cutting operations. The slicing section 16 is positioned at the outer end of the blade 11 and consequently at the thinner portion thereof. This thinness of blade and the arcuate edge 21 thereof render this portion of the cutting edge adapted for delicate cutting operations, such, for instance, as in forming the incision along the belly of the fish. The angularly disposed section 18 of the cutting edge is provided for use in removing the fins from the fish and for other purposes which will be apparent to the operator. The chopping section 17 extending toward the handle occupies the thicker portion of the blade 11 and is adapted for heavier types of cutting operations such, for example, as that in removing the head from the fish. Because of the thickness of the blade at this point this portion is best adapted for cutting the bony portion of the fish.

The opposite edge of the blade 11 is provided with a scaling edge having a section 22 along the major portion thereof and a section 23 on the curved portion at the outer end of the blade. Referring to Fig. 4, the section 23 is provided with pyramidally shaped scaling teeth 24 formed in the edge of the blade 11, each of the teeth having sloping side surfaces 25 and 26 and sloping forward and rear surfaces 27 and 28. This section of the scaling edge is adapted to be employed in removing the scales from the belly of the fish and from beneath the fins and like portions wherein the scales are relatively small and angularly positioned, the curved portion 29 of the scaling edge permitting the teeth 24 to be brought into contact with the scales in places of difficult accessibility.

The section 22 of the scaling edge is provided with teeth 31 and 32 to provide a saw-toothed scaling edge. The teeth 31 are provided with side 33 coplanar with the side of the blade 11, a sloping side 35, a sloping front surface 36 and rear surface 37. The tooth 32 is identical with 31 except that the sloping side 38 thereof lies at right angles to the sloping side 35 of the tooth 31. The section 22 is made up of alternately positioned teeth 31 and 32 to provide a substantially saw-toothed edge. This section of the scaling edge is adapted for use in scaling the main body of the fish, the sloping faces of alternate teeth permitting the loose scales to slide therethrough, whereby the efficiency of the scaling operation is increased.

A stationary jaw 39 is secured to the edge of the blade 11 between the scaling edge and the handle and is provided with a flat face 41 having a plurality of teeth 42 thereon projecting toward the handle of the knife. The blade 11 is provided with a notch 43 to closely receive a shoulder 44 on the jaw 39, a leg 45 projecting downward along the blade 11 to receive a rivet 46 which passes through the blade 11 and through the leg 45 to secure the jaw 39 to the blade. The function of the notch 43 and the shoulder 44 is to prevent edgewise movement of the jaw about the rivet 46. A rotatable jaw 47 is pivotally supported on the opposite side of the blade 11 by means of a rivet 48, the jaw being provided with a flat face 49 having a plurality of teeth 51 adapted to cooperate with the teeth 42 on the jaw 39 to clamp the skin of a fish therebetween. A lever 52 is formed integrally with the jaw 47 and extends through an angle 53 backward along the edge of the handle. It will be seen that by movement of the handle 52 between the solid line position shown in Fig. 2 and the dotted line position shown therein the teeth 51 are brought toward and away from the teeth 42 on the jaw 39. Thus, by moving the lever 42 to the dotted line position the skin of the fish may be inserted between the teeth 42 and 51 and it will be firmly held therebetween when the lever 52 is brought to the full line position, thereby closing the jaws 39 and 47. The edge of the blade 11 is cut away, as shown at 53, to permit the jaw 47 to be moved through a sufficient angle to accomplish its purpose.

When the jaws 39 and 47 are not in use the lever 52 is brought to the full line position shown in Fig. 2, thereby bringing the teeth 42 and 51 together. The lever 52 is held in this position by means of a latch, designated generally by the numeral 54, which consists of a strip of metal having a portion 55 lying parallel with the shank 12 of the blade and pivotally secured thereto by means of a rivet 56 and a portion 57 at right angles to the portion 55 adapted to bear against the end 58 of the lever 52 and prevent outward movement thereof. If desired, the end 58 of the lever 52 may be tapered, as shown at 59, so as to be useable as a screw-driver, thereby further increasing the utility of the tool. This tapering of the end 58 of the lever 52 permits the portion 57 of the latch to lie flush with the outer surface of the lever, thereby preventing it from being accidentally dislodged.

The advantages of my improved construction will doubtless have become apparent to those skiled in the art. I have provided a knife having a cutting edge embodying shape characteristics adapting it to a plurality of uses, a scaling edge so formed as to result in improved scaling efficiency, and a pair of jaws adapted to be employed in removing the skin of a fish.

Attention is directed to the fact that the jaws 39 and 47 are positioned between the handle and the scaling edge of the blade. This position of the jaws permits the lever 52 to project backward along the handle in a convenient position for operation and storage. It will further be seen that this position of the jaws permits the chopping section 17 to be brought completely in contact with a chopping block or other support for the fish during the cutting operations.

The angularly disposed cutting section 18 and the curved portion 29 of the scaling edge cooperate in providing a curvature to the outer end of the blade to permit the slicing section 16 to be provided, this structure resulting in increased scaling efficiency and in increased efficiency of the cutting edge of the blade.

While I have thus described and illustrated a specific embodiment of my invention I am aware that numerous alterations and changes may be made therein without departing from the spirit of the invention and I do not wish to be limited except as required by the prior art.

I claim:

1. In a combination fish knife including a blade, having operative edges and a handle for said blade, a pair of clamping jaws having wide faces spaced from and parallelly disposed with respect to one of said edges, a plurality of teeth on each of said jaws adapted to cooperate in gripping the skin of a fish, means for fixedly securing one of said jaws to said blade, means for rotatably supporting the other of said jaws on said blade, and a lever secured to the rotatably supported jaw adapted to cooperate with said handle in moving said jaw between an open and a closed position and holding said jaw in the closed position to draw the skin from a fish.

2. In a combination of a fish knife including a blade, having operative edges and a handle for said blade, a pair of clamping jaws having wide faces spaced from and parallelly disposed with respect to one of said edges, a plurality of teeth on each of said jaws adapted to cooperate in gripping the skin of a fish, means for fixedly securing one of said jaws to said blade, means for rotatably supporting the other of said jaws to said blade, a lever secured to the rotatably supported jaw adapted to cooperate with said handle in moving said jaw between an open and a closed position and holding said jaw in the closed position to draw the skin from a fish, and means for securing said lever against said handle when said jaws are not in use.

3. In a fish knife, the combination of, a handle, a blade provided with opposed edges, one of said edges having a cutting edge comprising a chopping portion adjacent to said handle terminating in an angularly disposed cutting portion, and an arcuate slicing edge extending from said angularly disposed portion to the end of said blade, the opposite edge of said blade having a scaling edge provided with an arcuate portion opposite said slicing portion and said angularly disposed cutting portion, and a substantialy straight portion opposite said chopping portion.

VINCENT A. ELVIN.